Figure 9:
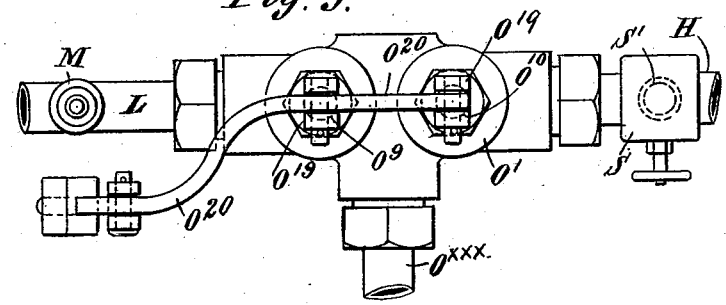

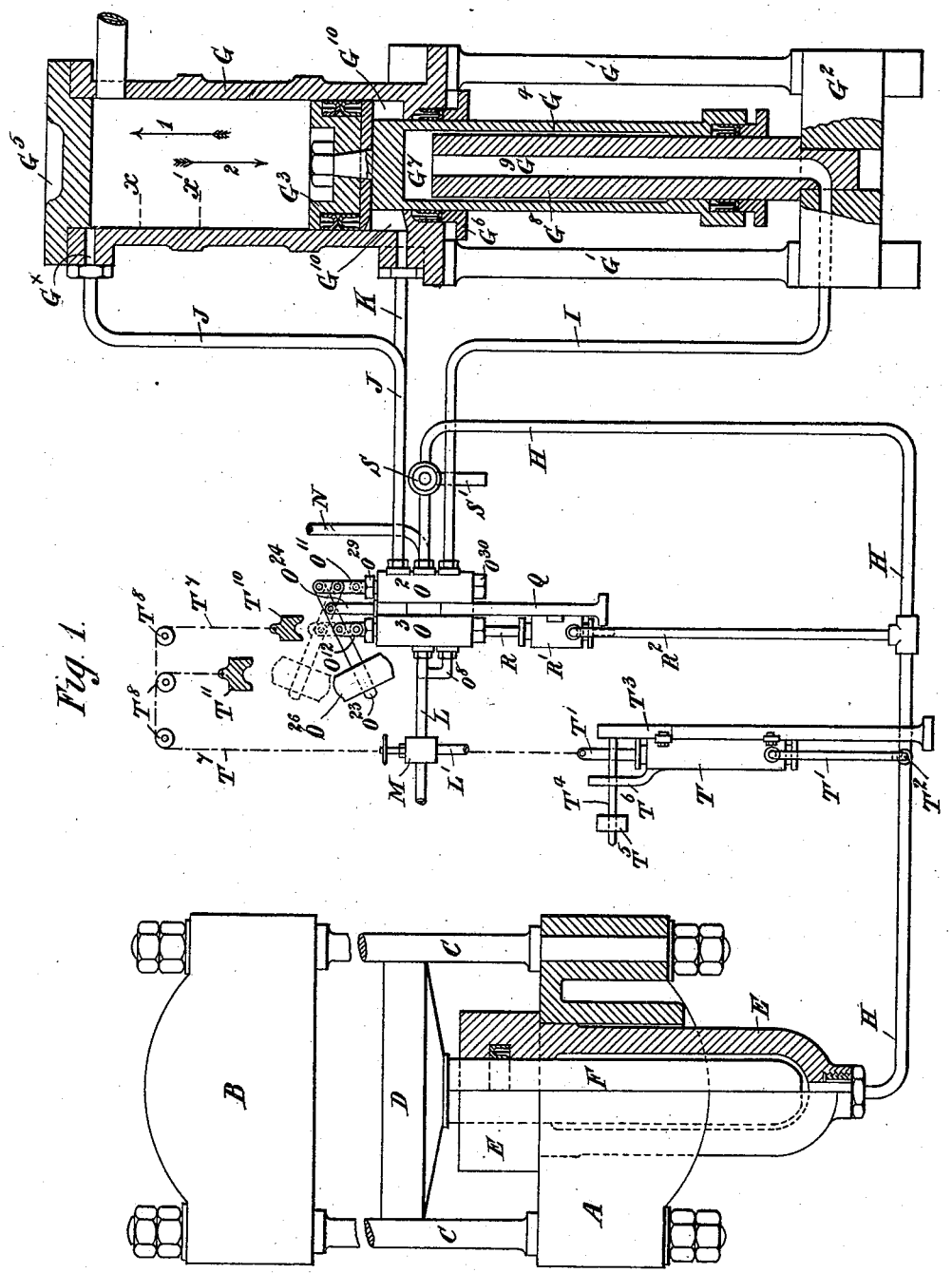

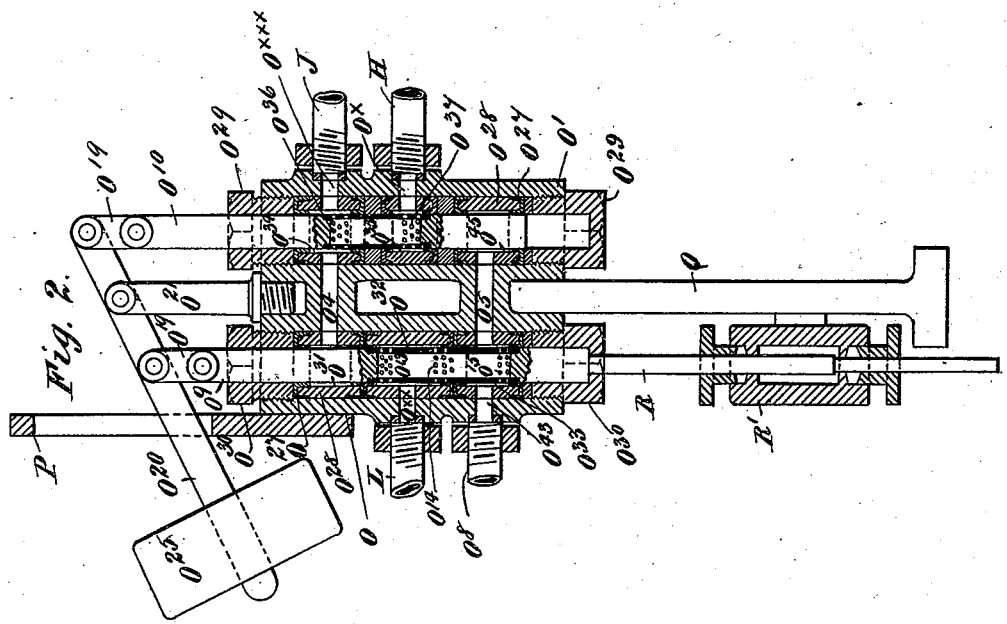
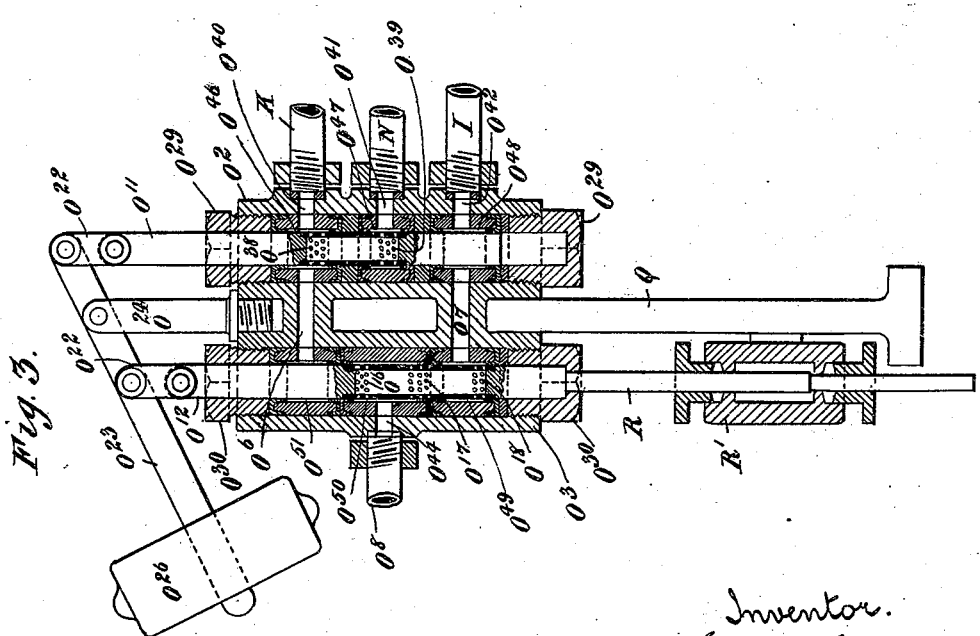

(No Model.) 5 Sheets—Sheet 3.
W. JAMES.
VALVE FOR HYDRAULIC APPARATUS, &c.
No. 556,419. Patented Mar. 17, 1896.
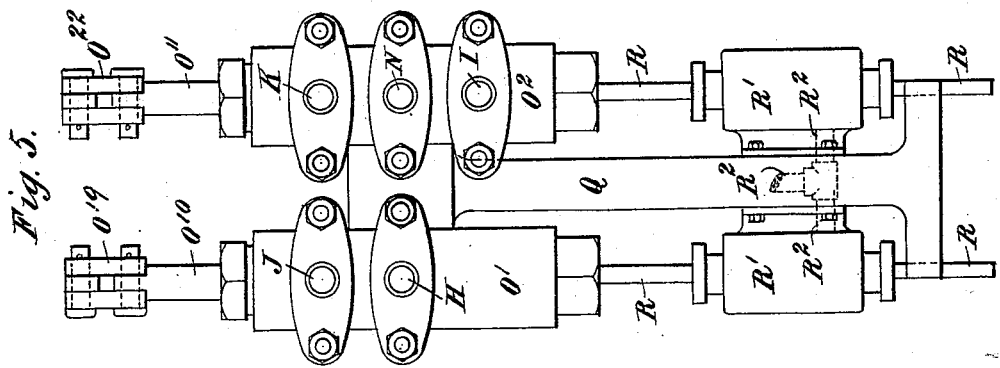
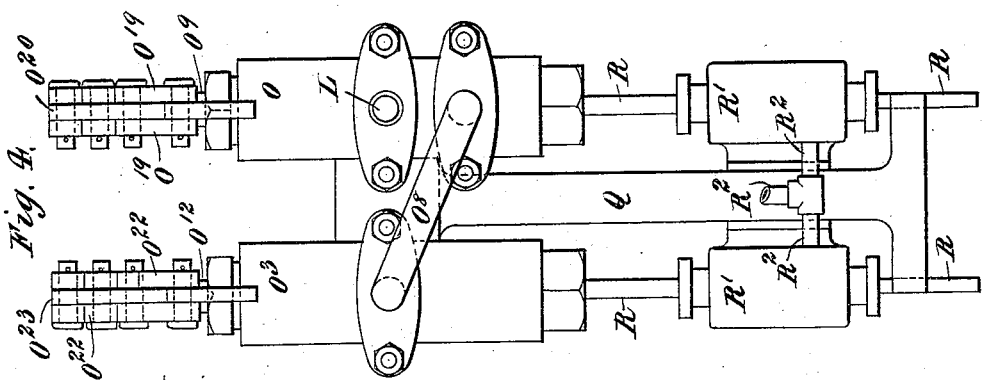
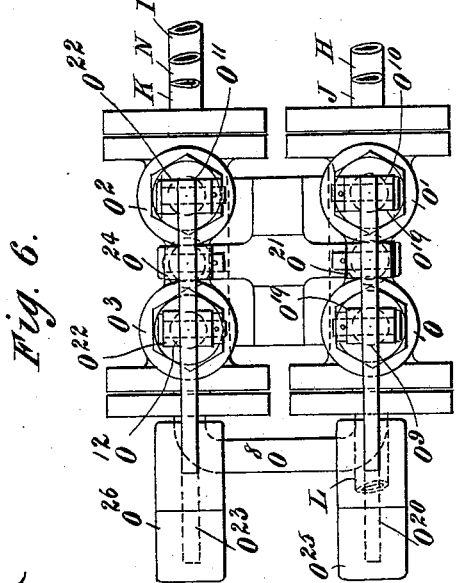
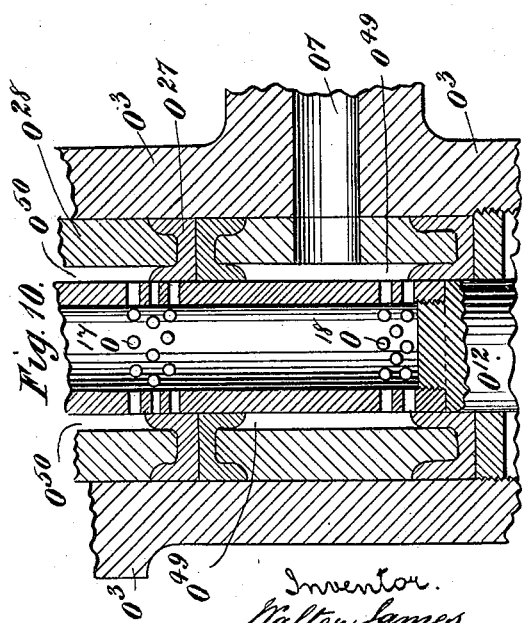
Witnesses:
Alan Balch.
Adam C. Hart.
Inventor.
Walter James
By
Fairburn Hart
Attorney (No Model.) 5 Sheets—Sheet 4.
W. JAMES.
VALVE FOR HYDRAULIC APPARATUS, &c.
No. 556,419. Patented Mar. 17, 1896.

Witnesses:
Alan Balch
Adam C. Hart

Inventor.
Walter James
By
W. Fairburn Hart
Attorney (No Model.) 5 Sheets—Sheet 5.
W. JAMES.
VALVE FOR HYDRAULIC APPARATUS, &c.

No. 556,419. Patented Mar. 17, 1896.

Witnesses.
William Sadler
Alan Balch.

Inventor.
Walter James
by
W. Fairburn Hart
Attorney

UNITED STATES PATENT OFFICE.

WALTER JAMES, OF LEEDS, ENGLAND.

VALVE FOR HYDRAULIC APPARATUS, &c.

SPECIFICATION forming part of Letters Patent No. 556,419, dated March 17, 1896.

Application filed July 17, 1894. Serial No. 517,818. (No model.) Patented in England February 24, 1892, No. 3,646, and July 11, 1894, No. 13,421.

*To all whom it may concern:*

Be it known that I, WALTER JAMES, a subject of the Queen of Great Britain, residing at Leeds, in the county of York, England, have invented new and useful improvements in valves particularly applicable for use with hydraulic apparatus for transmitting motion to presses and other machines, (for which I have received Letters Patent in England, No. 3,646, dated February 24, 1892, and No. 13,421, dated July 11, 1894,) of which the following is a specification.

This invention relates to improvements in valves particularly applicable for use in connection with hydraulic apparatus for transmitting motion to presses and other machines—such as, for instance, by means of apparatus known as "differential accumulators" or "intensifiers," by which the pressure of water and the speed of hydraulic rams may be regulated according to the work which has to be performed—that is to say, the combination of a cylinder with a smaller cylinder with a fixed tubular ram whereby by exposing at different times different areas to the action of the inlet-water and at the same time different areas to the water communicating with the hydraulic press or other machine the hydraulic press or other machine may be fed with more or less water and at a greater or less pressure from time to time, as may be desired; but I distinctly wish it to be understood that in this specification I make no claim broadly to the use of such apparatus when used separately from and independently of the arrangement of valves herein described and set forth, as such hydraulic apparatus for transmitting power is already well known in England.

The objects of the present invention are, first, to provide an arrangement of valves that will automatically reverse themselves whenever the maximum pressure for a given portion of the stroke of the press-ram has been reached and for afterward increasing the pressure for the remainder of the stroke of the said ram; secondly, to afford facilities by which water may be admitted at two or three different stages of pressure during the ascent and descent of the accumulator-piston, and, thirdly, to return the press-ram and either piston or ram, or both, of the differential accumulator or intensifier to their normal positions by utilizing the water already employed for pressing purposes. I attain these objects by means of mechanism herein described, and which for the purpose of clearly and concisely illustrating the principle and working of the valves I have in the accompanying drawings shown them applied to a hydraulic press such as is ordinarily used in the woolen trades; but I distinctly wish it to be understood that they may be combined with or applied to other machines—such as, for instance, to shearing and riveting machines, as well as to forging presses and the like.

Figure 8:
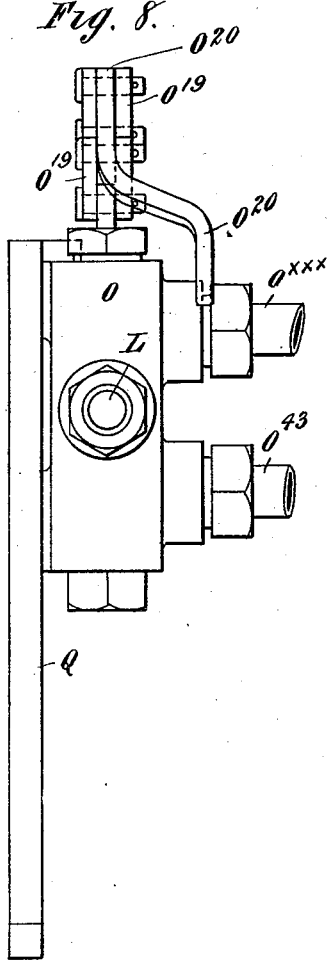
Figure 7:
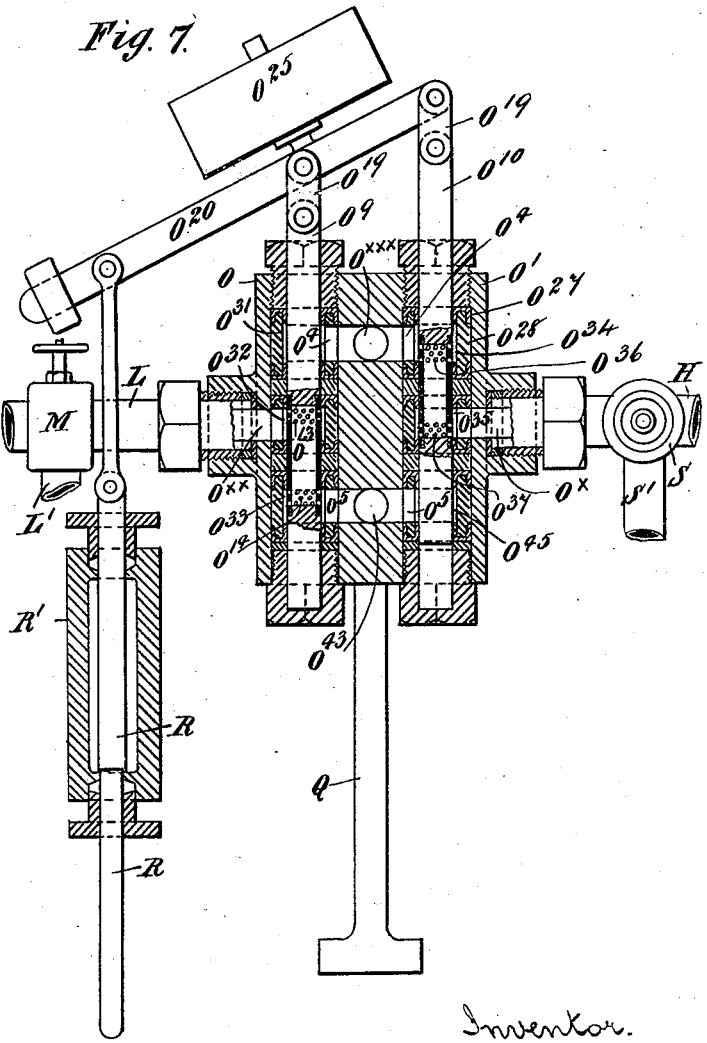

In the drawings annexed, Figure 1 is a part sectional elevation of a hydraulic press and differential accumulator with my arrangement of valves applied. Fig. 2 is a part sectional elevation of the front set of valves, drawn to a larger scale than Fig. 1, shown in the position occupied when the accumulator-piston is traveling upward, say, as far as $x'$, Fig 1. Fig. 3 is a part sectional elevation of the back set of valves, drawn to the same scale as Fig. 2, shown in the position occupied when the accumulator-piston is traveling upward, say, as far as $x'$, Fig. 1. Fig. 4 is an end elevation looking at the front of the valves shown at Figs. 2 and 3 and drawn to the same scale. Fig. 5 is an end elevation looking at the back of the valves shown at Figs. 2 and 3 and drawn to the same scale. Fig. 6 is a plan looking at the top of valves shown at Figs. 2 and 3 and drawn to the same scale. Fig. 7 is a sectional elevation of a single set of valves constructed according to my invention. Fig. 8 is an end elevation of the same valve; Fig. 9, a plan looking on the top of the same valve. Fig. 10 is an enlarged part sectional elevation of a spindle, leathers, and packings forming a prominent feature of the valves shown at Figs. 2, 3, and 7, and Fig. 11, a sectional elevation of valves, showing lever $O^{23}$ additionally weighted by weight $T^{10}$, which is operated by the ram in cylinder $T^\times$.

Like parts in all the views are marked with the same letters and figures of reference.

A and B are respectively the press bottom and top; C C, the stay-rods for supporting the top; D, the press-table; E, the press-cylinder, and F the ram working in said cylinder and to which the table D is attached.

G is the cylinder of the differential accumulator, and it is provided with covers at one or both ends or only with a cover $G^5$ and with a gland $G^6$ at the opposite end of the cylinder, (provided with U-leathers,) through which the piston-rod $G^4$ works. This cylinder is supported on stay-rods $G'$ $G'$, by which it is attached to the foundation-plate or bed $G^2$. In the cylinder G a piston $G^3$ reciprocates, and the piston is attached to the hollow piston-rod $G^4$ by bolts or other convenient means. The cavity $G^7$ in the piston-rod $G^4$ forms a second and smaller cylinder, into which is passed a stationary tubular ram $G^8$, provided with a passage $G^9$ and fixed to the base or foundation-plate $G^2$.

All the above-described parts are of ordinary or known construction.

The press-cylinder E and the differential accumulator are connected to a valve-box, to be hereinafter described, by pipes H, I, J, and K.

L is the inlet-pipe communicating with the valve-box and armed with a hydraulic valve M of ordinary and suitable construction. It is also provided with an outlet $L'$.

N is a pipe which communicates with a tank or reservoir. (Not shown in the drawings.)

The valve-box is constructed as follows: O $O'$ $O^2$ $O^3$ are four compartments in tubular form united together by passages $O^4$ $O^5$ $O^6$ $O^7$ $O^8$—that is to say, compartments O $O'$ are connected together by passages $O^4$ $O^5$ and compartments $O^2$ $O^3$ by passages $O^6$ $O^7$, while compartments O and $O^3$ are further connected together by passage $O^8$. Passages $O^\times$ $O^{\times\times}$ $O^{\times\times\times}$ respectively communicate with pipes H, L, and J, passages $O^{40}$ $O^{41}$ $O^{42}$ respectively with pipes K, N, and I, and passages $O^{43}$ $O^{44}$ respectively with the ends of pipe $O^8$.

In the compartments O $O'$ $O^2$ $O^3$ are arranged to slide the spindles $O^9$ $O^{10}$ $O^{11}$ $O^{12}$, which are constructed in any desired number of parts and are partly solid and partly hollow, so as to form valves and water-ways for the passage or regulation of the water to or from the press and differential accumulator, as hereinafter set forth.

In the drawings I have shown the spindles $O^9$ $O^{10}$ $O^{11}$ $O^{12}$ made in three portions, their center portions being made hollow and perforated as follows: For spindles $O^9$ and $O^{12}$ there are three sets of perforations, namely: $O^{13}$ $O^{14}$ $O^{15}$ in spindle $O^9$, which communicate respectively with passages $O^4$, $O^{\times\times}$, $O^5$, and $O^{43}$, while spindle $O^{12}$ is similarly provided with three sets of perforations $O^{16}$ $O^{17}$ $O^{18}$, communicating with passages $O^6$, $O^{44}$, and $O^7$.

$O^{36}$ $O^{37}$ $O^{38}$ $O^{39}$ are perforations respectively in the spindles $O^{10}$ $O^{11}$ and communicate as follows, namely: perforations $O^{36}$ in spindle $O^{10}$ with passages $O^4$ $O^{\times\times\times}$ $O^\times$, perforations $O^{37}$ in spindle $O^{10}$ with passages $O^5$ and $O^\times$, perforations $O^{38}$ in spindle $O^{11}$ with passages $O^{40}$, $O^6$, and $O^{41}$, and perforations $O^{39}$ in spindle $O^{11}$ with passages $O^{41}$, $O^{42}$, and $O^7$.

The spindles $O^9$ $O^{10}$ are connected by links $O^{19}$ to the lever $O^{20}$ fulcrumed to the pillar $O^{21}$, while spindles $O^{11}$ $O^{12}$ are similarly connected by links $O^{22}$ to lever $O^{23}$ fulcrumed to pillar $O^{24}$. Weights $O^{25}$ $O^{26}$ are provided on levers $O^{20}$ $O^{23}$.

Annular spaces $O^{31}$ $O^{32}$ $O^{33}$ surround spindle $O^9$ and communicate, respectively, with passages $O^4$, $O^{\times\times}$, $O^{43}$ and $O^5$. Annular spaces $O^{34}$ $O^{35}$ $O^{45}$ surround spindle $O^{10}$ and communicate, respectively, with passages $O^{\times\times\times}$ $O^4$, $O^\times$ and $O^5$. Annular spaces $O^{46}$ $O^{47}$ $O^{48}$ surround spindle $O^{11}$ and communicate with passages $O^6$ $O^{40}$ $O^{41}$ $O^7$ $O^{42}$. Annular spaces $O^{49}$ $O^{50}$ $O^{51}$ surround spindle $O^{12}$ and communicate with passages $O^7$, $O^{44}$ and $O^6$. U-leathers or other suitable packings $O^{27}$ are also provided above and below the perforations for making water-tight joints around the spindles and through which the latter work. The leathers $O^{27}$ are retained in position by removable metal ring pieces $O^{28}$, which in turn are secured in position by means of the nuts $O^{29}$ $O^{30}$, and which latter also form bearings for the spindles.

It will be seen on reference to the drawings that only when any of the perforations in the spindles are moved below one of the hydraulic leathers $O^{27}$ the communication with a given passage is cut off. Thus, for instance, as at Fig. 3, to prevent the water passing directly from pipe K through passages $O^{40}$ $O^6$ to $O^{44}$ and out at $O^8$ the perforations $O^{16}$ in spindle $O^{12}$ are moved, as shown, below the second set of leathers in compartment $O^3$. In all cases water is prevented passing from one annular space to another by the leathers $O^{27}$.

P is a guide piece or stop for preventing the levers $O^{20}$ $O^{23}$ from rising too high or falling too low and thereby removing unnecessary strain from the spindles.

Q is a stand upon which the valve-box may be mounted.

R are rams which may be solid, as shown, and either with or without reduced portions sliding through the bottom of the cylinders $R'$, or they may be in the form of a fixed tubular ram with a cylinder sliding on the same and passing into the compartments O and $O^3$. The rams R slide in cylinders $R'$ and connected by pipes $R^2$ with the pipe H leading to the press-cylinder E, and are employed for automatically reversing the valve-spindles, being placed under $O^9$ and $O^{12}$, or, if desired, under levers $O^{20}$ and $O^{23}$.

S is a hydraulic valve of ordinary construction fixed to the pipe H for relief purposes and connected by pipe $S'$ with the reservoir or tank.

T $T^\times$ are cylinders of the same or varying lengths, preferably of varying lengths, and placed behind each other, so that at Fig. 1 the cylinder $T^\times$ is not seen. In the said cylinders work the rams $T'$ $T^{\times\times}$ connected by pipe $T^2$ with the pipe H leading to the press-cylinder E. On the top of each cylinder is fixed a pillar $T^3$, to which is pivoted a lever $T^4$ passing through the upper portion of one of the rams and weighted respectively at $T^5$ and $T^{14}$.

$T^6$ is a guide for preventing the lever $T^4$ rising too high or falling too low. Weights $T^{10}$ $T^{11}$ are respectively attached to the rams $T'$ and $T^\times$ by chains $T^7$ passing over pulleys $T^8$. The weight $T^{10}$ is arranged to pass, when required, over the lever $O^{23}$ near to the spindle $O^{12}$ and the weight $T^{11}$ to pass onto weight $O^{26}$. When not in use the weights $T^{10}$ $T^{11}$ are suspended clear of lever $O^{23}$, so as not to interfere with its working.

The cylinders T and $T^\times$ and rams T' and $T^{\times\times}$ are provided solely for the purpose of bringing the two weights $T^{10}$ and $T^{11}$ into action, so as to actuate the valves and give the varying pressures in the order hereinafter described.

Figure 11:
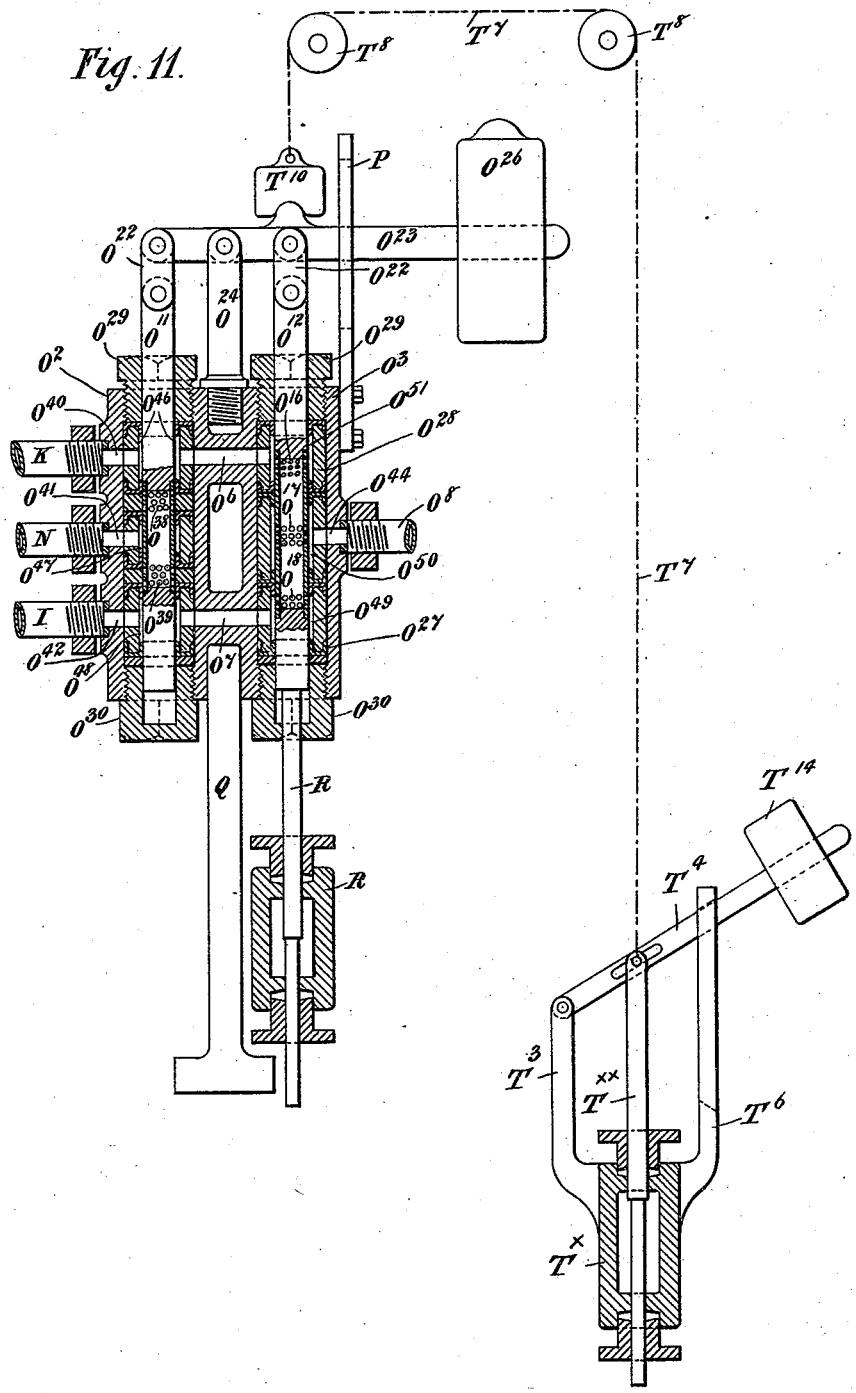

In Fig. 11 I have shown the weight $T^{10}$ lowered onto the lever $O^{23}$ by the ram $T^{\times\times}$ and chain $T^7$, which passes over pulleys $T^8$ $T^8$. The lever $O^{23}$ is shown in this view in a midway position.

In order to cause the rams R, T' and $T^{\times\times}$ to be actuated at the proper times and to give the power necessary for any given amount of work required, the two weights $T^5$ and $T^{14}$, as well as weights $O^{25}$ and $O^{26}$, will require to be adjusted on their respective levers at the proper distances from their fulcra, so that the pressure in the pipe H, which is the same in all the pipes connected therewith, will actuate the rams in the following order as the pressure in the pipe H increases to overcome the respective weights—namely, first, to actuate the ram R in cylinder R' for lifting the spindle $O^{12}$; second, for actuating ram $T^{\times\times}$ in cylinder $T^\times$ for lowering weight onto spindle $O^{12}$; third, for actuating ram R in cylinder R' under spindle $O^9$ for lifting weight $O^{25}$; fourth, for again actuating ram R in cylinder R' under spindle $O^{12}$ for raising it and the weights $O^{26}$ and $T^{10}$; fifth, for actuating ram T' in cylinder T for lowering weight $T^{11}$ onto the weight $O^{26}$ and causing it to descend.

It will readily be seen on reference to the various figures that during the upward stroke of the piston $G^3$ the valve-spindles $O^9$ $O^{10}$ remain in the same position during the whole of its upward stroke.

I will now describe the action of the valves for transmitting motion from the accumulator to the press.

The levers $O^{20}$ $O^{23}$ are depressed to their lowest position, as shown in the drawings. At the same time the piston $G^3$, cylinder $G^4$, ram F and table D are all at their lowest points. The valve M is opened to allow water to pass under pressure from pumps or other convenient source through pipe L to passage $O^{\times\times}$ in compartment O, through annular space $O^{32}$ to perforations $O^{14}$, thence through hollow portion of the spindle $O^9$ and out through perforations $O^{15}$ into annular space $O^{33}$ to fill up passage $O^5$, and after doing so passes along passage $O^{43}$ into annular space $O^{50}$ of compartment $O^3$, thence through perforations $O^{16}$ $O^{17}$, down hollow portion of spindle $O^{12}$, out through perforations $O^{18}$ into annular space $O^{49}$ into passage $O^7$ and annular space $O^{48}$ into passage $O^{42}$ and pipe I, thence into passage $G^9$ and smaller cylinder $G^7$ for raising the piston $G^3$ in the direction of arrow 1 in the cylinder G. When the piston $G^3$ rises, any water that may have previously entered the cylinder G above the piston $G^3$ is forced therefrom by the piston through pipe J and enters the compartment O' through passage $O^{\times\times\times}$, into annular area $O^{34}$, passes through perforations $O^{36}$, down hollow portion of spindle $O^{10}$, out through perforations $O^{37}$ into annular space $O^{35}$ and passage $O^\times$ to pipe H, by which it is conveyed to press-cylinder E for quickly raising the ram F and table D to their work. During the ascent of the piston $G^3$ water is passed from the tank or reservoir through pipe N into passage $O^{41}$ and annular area $O^{47}$, through perforations $O^{39}$ into and up the hollow portion of spindle $O^{11}$, out through perforations $O^{38}$ into annular area $O^{46}$, and along passage $O^{40}$ and pipe K to fill the space $G^{10}$ (hereinafter termed "annular area") in the cylinder G caused by the upward motion of the piston $G^3$, but it does no work.

Just before the piston $G^3$ reaches, say, the top of its stroke the table D will have quickly risen to its work, and the pressure obtained by the continued rising of the piston is employed for reversing the spindles $O^9$ $O^{10}$, the other two spindles, $O^{11}$ $O^{12}$, being weighted for this operation to prevent them being altered. This is accomplished by means of the sliding ram R (shown in Fig 2) working in casing R' connected to the pipe H by pipes $R^2$. When the table D has risen to its work, the surplus pressure passes from the pipe H through the pipe $R^2$ to the ram R, which, owing to the pressure in pipe H not at this stage being sufficient to lift the table D higher, increases in the pipes H and $R^2$ until it lifts the ram R and automatically changes the position of spindles $O^9$ $O^{10}$ for giving the final pressure. Water then entering the compartment O through pipe L and passage $O^{\times\times}$ into annular area $O^{32}$ passes through perforations $O^{14}$ $O^{15}$ into and up the hollow portion of spindle $O^9$, out through perforations $O^{13}$ into annular area $O^{31}$, passage $O^4$, annular area $O^{34}$, and passage $O^{\times\times\times}$, up pipe J into the top of the cylinder G at $G^\times$ above the piston $G^3$, which causes it to descend. The water that has previously been used in the small cylinder $G^7$ for raising the piston is now forced back through the passage $G^9$ of the fixed tubular ram through pipe I (see Fig. 3) into compartment $O^2$, through passage $O^{42}$ into annular area $O^{48}$, along passage $O^7$ into annular area $O^{49}$, through perforations $O^{18}$, up the hollow portion of spindle $O^{12}$, out through perforations $O^{17}$ $O^{16}$ into annular area $O^{50}$ and passage $O^{44}$, along pipe $O^8$ into compartment O, through passage $O^{43}$ into annular area $O^{33}$, along passage $O^5$ into annular area $O^{45}$, through perforations $O^{37}$ into and up the hollow portion of spindle $O^{10}$, out through perforations $O^{36}$ into annular area $O^{35}$ and passage $O^\times$ to pipe H, and thence to the press-cylinder E and ram F for giving the increased final pressure. By admitting water to the cylinder G above the piston $G^3$ by reason of the area of the piston $G^3$ being greater than that of the fixed ram $G^8$ the water in the smaller cylinder will be forced through pipe I and passages, as described, to the pipe H for imparting an increased pressure to the table D through the ram F. On the descent of the piston $G^3$ two operations are performed. First, the water in the annular space $G^{10}$ is returned to the tank or reservoir by the same way as which it entered without performing any work, and, second, the water which was used for raising the piston $G^3$ is used, as just described, for imparting the increased pressure to the press-ram F.

It will be readily understood in the above-described operations when it is required to quickly raise the table to its work the water from the reservoir is admitted to valves so as to pass to pipe I and passage $G^9$ to smaller cylinder $G^7$, and by transmitting pressure from the small area of the said cylinder to the larger area of the piston $G^3$ the press-ram F will be quickly raised; but when it is required to impart an increased pressure to the ram F after it has been raised to its work I reverse the spindles $O^9$ and $O^{10}$ by means of the ram R, as described, and then admit water through pipe J to cylinder G, and the pressure is then imparted from the larger area of piston $G^3$ to the smaller area of the cylinder $G^7$.

When the ram F is required to be returned to its lowest position in the cylinder E the valve M is then reversed so as to cut off the supply-water through pipe L and to open the outlet L', which causes the spindle $O^9$ and ram R to descend to their lowest positions and spindle $O^{10}$ to rise to its highest point, thereby removing all pressure from the table D and ram F, which allows the latter to fall to its normal position. On the ram F falling the water which has been employed for raising it is passed through H to passage $O^\times$ into annular area $O^{35}$, through perforations $O^{37}$ into and up the hollow portion of spindle $O^{10}$, out through perforations $O^{36}$ into annular space $O^{\times\times\times}$ and pipe J (the exit from passage $O^4$ and annular space $O^{31}$ being closed by reason of the perforations $O^{13}$ being below or covered by the upper double set of U-leathers in the compartment O) for filling the cylinder G above the piston and completing the downward stroke of the piston $G^3$ and smaller cylinder $G^7$; but should the piston $G^3$ have reached the bottom of its stroke before the whole of the water has been ejected from the press-cylinder E then the relief-valve S may be opened to allow the water to pass directly from the pipe H through pipe S' to the tank or reservoir. At the same time the water in the smaller cylinder $G^7$ is by the descent of the piston $G^3$ forced through passage $G^9$ in the fixed tubular ram $G^8$ into pipe I, passage $O^{42}$, annular space $O^{48}$, passage $O^7$, annular space $O^{49}$, through perforations $O^{18}$ into and up the hollow portion of spindle $O^{12}$, out through perforations $O^{17}$ $O^{16}$ into annular space $O^{50}$ and passage $O^{44}$, along pipe $O^8$ to passage $O^{43}$ in compartment O and annular space $O^{33}$, through perforations $O^{15}$ into and up hollow portion of spindle $O^9$, through perforations $O^{14}$ $O^{13}$ into annular space $O^{32}$ and passage $O^{\times\times}$ into pipe L and out to a tank through outlet L' of valve M. During the passage of the water from the press-cylinder E and smaller cylinder $G^7$, as just described, the water from the annular area $G^{10}$ under the piston $G^3$ is passed, as already described, through pipes K and N to the tank or reservoir.

The apparatus is then ready for a repetition of the above-described operation; but when it is required to raise the piston $G^3$ and press-ram F or to depress the said piston and raise the press-ram by varying pressures I proceed as follows: The valve M is opened to admit the inlet-water through pipe L to the valves. The spindles, to commence with, are arranged as follows: $O^9$ $O^{12}$ are down and $O^{10}$ $O^{11}$ up. The inlet-water passes through passage $O^{\times\times}$ into annular space $O^{32}$, through perforations $O^{13}$ $O^{14}$, down hollow portion of spindle $O^9$, out through perforations $O^{15}$ into annular area $O^{33}$ and passage $O^{43}$ (passage $O^5$ being full of water and its exit closed by reason of the perforations $O^{37}$ being between or closed by the lower double set of leathers $O^{27}$ in compartment O') to and along pipe $O^8$ to passage $O^{44}$ and annular area $O^{50}$, thence through perforations $O^{16}$ $O^{17}$ into and down the hollow portion of spindle $O^{12}$ and out through perforations $O^{18}$ into annular area $O^{49}$, passage $O^7$, annular area $O^{48}$, passage $O^{42}$, and pipe I, by which it is conveyed to the passage $G^9$ of the fixed tubular ram into the smaller cylinder $G^7$ for raising the piston $G^3$ to the point $x'$ in the cylinder G. While this is being done the water that has previously entered the cylinder G above its piston $G^3$ will, by the upward motion of the same, be forced along pipe J into compartment O', through passage $O^{\times\times\times}$ into annular area $O^{34}$, through perforations $O^{36}$ into and down hollow portion of spindle $O^{10}$, out through perforations $O^{37}$ into annular space $O^{35}$ and passage $O^\times$ to pipe H and press-cylinder E for quickly raising the press-ram F and table D to their work. During the raising of the piston $G^3$ and press-ram F water is passed from the tank to the annular area $G^{10}$, under the piston $G^3$, through pipe N, passage $O^{41}$, perforations $O^{39}$, into and up hollow portion of the spindle $O^{11}$, out through perforations $O^{38}$, into annular area $O^{40}$ (the passage $O^6$ and annular area $O^{51}$ being filled with water and its exit closed by reason of the perforations $O^{16}$ being below or covered by the upper set of double U-leathers $O^{27}$ in compartment $O^3$) and passage $O^{40}$ to pipe K for conveyance to the annular area $G^{10}$. On the piston $G^3$ continuing to rise above point $x'$ the pressure is by the resistance of the bale or other work upon the press-table and against the top B of the press transmitted through pipes H and $R^2$ to the ram R under the spindle $O^{12}$, which at once is raised to its highest point and spindle $O^{11}$ depressed to its lowest position, the spindles $O^9$ $O^{10}$ being weighted sufficiently to keep them for the present stationary—that is, spindle $O^9$ is down and spindle $O^{10}$ is raised. The inlet-water now entering through pipe L is directed to the annular space $G^{10}$ and the water from the tank passes to the smaller cylinder $G^7$ for filling-up purposes—that is to say, inlet-water entering through pipe L passes through passage $O^{\times\times}$, annular area $O^{32}$, perforations $O^{14}$, into and down hollow portion of spindle $O^9$, out through perforations $O^{15}$, into annular space $O^{33}$, passage $O^{43}$, pipe $O^8$, passage $O^{44}$, annular space $O^{50}$, through perforations $O^{17}$ $O^{18}$, into and up hollow portion of spindle $O^{12}$ (perforations $O^{18}$ being then sufficiently covered or sealed by the lower set of double leathers $O^{27}$ in compartment $O^3$) to prevent the water passing into annular area $O^{49}$ below the said perforations, into annular area $O^{51}$, along passage $O^6$, into annular area $O^{46}$, passage $O^{40}$, pipe K, to annular area $G^{10}$ for lifting the piston $G^3$ at a greater pressure than when it is simply raised by water entering the smaller cylinder $G^7$ through passage $G^9$ in the fixed tubular ram. The water from the cylinder G to the press-cylinder E passes in a similar manner from pipe J to pipe H, as already described, when the inlet-water passes to the smaller cylinder $G^7$ as spindles $O^9$ $O^{10}$ remain in the same position; but the water from the tank now passes from pipe N into compartment $O^2$ through passage $O^{41}$, perforations $O^{38}$, down hollow portion of spindle $O^{11}$, out through perforations $O^{39}$, into annular space $O^{48}$, passage $O^{42}$, pipe I, passage $G^9$ in fixed tubular ram to smaller cylinder $G^7$ for filling it. The piston during this operation, say, may rise between points $x'$ and $x$.

On the piston $G^3$ rising above the point $x$, the pressure obtained therefrom not being sufficient to raise the table D any higher, the pressure is then utilized for raising ram T', the cylinder in which it works being connected by pipe $T^2$ with the pipe H, which causes the weight $T^{10}$ to descend onto the lever $O^{23}$ and to depress the said lever until the spindles $O^{11}$ $O^{12}$ are about midway in the compartments $O^2$ $O^3$, the spindles $O^9$ $O^{10}$ remaining in their former position—that is to say, $O^9$ is at its lowest point, while $O^{10}$ is at its highest. The inlet-water is now enabled to enter both the annular area $G^{10}$ and smaller cylinder $G^7$ at the same time, (the water from the tank through pipe N having been cut off,) whereby the piston $G^3$ is raised to the top of its cylinder and an increased pressure raising the table D still higher. The inlet-water enters by pipe L through passage $O^{\times\times}$, annular area $O^{32}$, perforations $O^{13}$ $O^{14}$, down hollow portion of spindle $O^9$, out through perforations $O^{15}$ into annular area $O^{33}$, passage $O^{43}$, passage $O^8$, passage $O^{44}$, annular area $O^{50}$, through perforations $O^{17}$, and escapes from the hollow portion of spindle $O^{12}$ through perforations $O^{16}$ and $O^{18}$, respectively, into annular areas $O^{51}$ $O^{49}$ and passages $O^6$ $O^7$. The water passing through passage $O^6$ enters annular area $O^{46}$ and passage $O^{40}$ to pipe K, by which it is conveyed to the annular area $G^{10}$. The water passing into passage $O^7$ enters annular area $O^{48}$ and passage $O^{42}$ to pipe I, by which it is conveyed to the passage $G^9$ in the fixed tubular ram and smaller cylinder $G^7$. By the above-described means the piston $G^3$ is raised to the top of cylinder G. Just before the piston $G^3$ reaches the top of cylinder G the ram R under spindle $O^9$ is raised by reason of the pressure not being sufficient to overcome the resistance of the bale or its equivalent on the table D, and by the compression of the water in the cylinder E and pipe H the pressure is transmitted to the ram R for reversing the spindles $O^9$ and $O^{10}$—that is, $O^9$ is raised and $O^{10}$ lowered, while spindles $O^{11}$ $O^{12}$ remain in the midway position—the inlet-water entering the compartment O through passage $O^{\times\times}$, into annular area $O^{32}$ through perforations $O^{14}$ $O^{15}$, up hollow portion of spindle $O^9$ and out through perforations $O^{13}$ into annular area $O^{31}$, passage $O^4$, annular area $O^{34}$, passage $O^{\times\times\times}$ to pipe J for conveyance to the top of the cylinder G for returning the piston $G^3$ in the direction of arrow 2 to point $x$. While the piston $G^3$ is descending to point $x$ the water previously admitted to the annular area $G^{10}$ and smaller cylinder $G^7$ is passed to the press-cylinder E for giving an increased pressure to the ram F for raising table D, as follows: The water in annular area $G^{10}$ is forced by the descent of the piston $G^3$ through pipe K, passage $O^{40}$, annular area $O^{46}$, passage $O^6$, annular area $O^{51}$, perforations $O^{16}$, down hollow portion of spindle $O^{12}$ and out through perforations $O^{17}$ into annular space $O^{50}$, passage $O^{44}$ to pipe $O^8$. At the same time the water from cylinder $G^7$ is passing through passage $G^9$ of fixed tubular ram, pipe I, passage $O^{42}$, annular area $O^{48}$, passage $O^7$, annular area $O^{49}$, perforations $O^{18}$, up hollow portion of spindle $O^{12}$ and out through perforations $O^{50}$ into passage $O^{44}$, where it joins the water from pipe K and passes through pipe $O^8$, passage $O^{43}$, annular area $O^{33}$, passage $O^5$, annular area $O^{45}$, perforations $O^{37}$, up hollow portion of spindle $O^{10}$ and out through perforations $O^{36}$ into annular area $O^{35}$, passage $O^{\times}$ and pipe H, by which it is conveyed to the press-cylinder E for imparting the extra pressure required for raising the table D.

Just before the piston $G^3$ reaches the point $x$ and in order to obtain a further increase of pressure to be given to the ram F, I cause the ram R under spindle $O^{12}$ to be raised with the added weight $T^{10}$ still on the lever $O^{23}$ by means of the compression of the water in cylinder E and pipes H and $R^2$. This motion moves spindle $O^{11}$ down to its lowest point and spindle $O^{12}$ up to its highest position. The ram T' being still kept by the pressure of the water raised allows the chain $T^7$ to become slack. The spindles $O^9$ $O^{10}$ are respectively in their highest and lowest positions. The inlet-water entering at pipe L passes through passage $O^{xx}$, annular area $O^{32}$, perforations $O^{14}$ $O^{15}$, up hollow portion of spindle $O^9$, out through perforations $O^{13}$ into annular area $O^{31}$, passage $O^4$, annular area $O^{34}$, passage $O^{xxx}$ to pipe J and thence into the cylinder G for returning the piston, say, from point $x$ to $x'$. During this portion of the stroke of the piston $G^3$, the water in the small cylinder $G^7$ is passed to tank through passage $G^9$, pipe I, passage $O^{42}$, annular area $O^{48}$, perforations $O^{39}$, hollow portion of spindle $O^{11}$, perforations $O^{38}$, annular area $O^{47}$, passage $O^{41}$, and pipe N, the water from annular area $G^{10}$ meanwhile being passed through pipe K, passage $O^{40}$, annular area $O^{46}$, passage $O^6$, annular area $O^{51}$, perforations $O^{16}$, down hollow portion of spindle $O^{12}$, out through perforations $O^{17}$ $O^{18}$ into annular area $O^{50}$, passage $O^{44}$, pipe $O^8$, passage $O^{43}$, annular area $O^{33}$, passage $O^5$, annular area $O^{45}$, perforations $O^{37}$, up hollow portion of spindle $O^{10}$, out through perforations $O^{36}$ into annular area $O^{34}$, passage $O^x$ and pipe H to press-cylinder E for imparting the increased pressure to ram F for raising the table D.

Before the piston $G^3$ reaches, say, the point $x'$, and when a still greater pressure is required to be imparted to the press-ram F, the lever $O^{23}$ is again weighted by the second and heavier weight $T^{11}$ being lowered onto the weight $O^{26}$ for returning spindle $O^{12}$ to its lowest point and raising spindle $O^{11}$ to its highest position. This is accomplished by the pressure being by the compression of the water in pipe H transmitted through pipe $T^2$ to cylinder $T^x$, which raises ram $T^{xx}$ and continues to lower the weight $T^{11}$ until the spindle $O^{12}$ is at the bottom of its stroke, and spindle $O^{11}$ raised to its highest point, the weight $T^{10}$ being left suspended in a midway position. The spindles $O^9$ $O^{10}$ are respectively in their highest and lowest positions. Inlet-water enters pipe at L, passes through $O^{xx}$, annular area $O^{32}$, perforations $O^{14}$ $O^{15}$, up hollow portion of spindle $O^9$, out through perforation $O^{13}$ into annular area $O^{31}$, passage $O^4$, annular area $O^{34}$, passage $O^{xxx}$ to pipe J, by which it is conveyed into cylinder G for causing the piston $G^3$ to descend, say, from point $x'$ to the bottom of the cylinder for giving the final and increased pressure to the bale or other work on the table D. During the descent of the piston the water in annular area $G^{10}$ passes therefrom through pipe K, passage $O^{40}$, annular area $O^{46}$, perforations $O^{38}$, down hollow portion of spindle $O^{11}$, out through perforations $O^{39}$ into annular area $O^{47}$, passage $O^{41}$, and pipe N, by which it is conveyed to the tank. At the same time the water in the smaller cylinder $G^7$ passes through passage $G^9$ in fixed tubular ram, pipe I, passage $O^{42}$, annular area $O^{48}$, passage $O^7$, annular area $O^{49}$, perforations $O^{18}$, up hollow portion of spindle $O^{12}$, out through perforations $O^{16}$ $O^{17}$ into annular area $O^{50}$, passage $O^{44}$, pipe $O^8$, passage $O^{43}$, annular area $O^{33}$, passage $O^5$, annular area $O^{45}$, perforation $O^{37}$, up hollow portion of spindle $O^{10}$, and out through perforations $O^{36}$ into annular area $O^{35}$, passage $O^x$ and pipe H, by which it is conveyed to press-cylinder E for imparting the final and increased pressure to the ram F for raising the table D.

When it is desired to return the rams F R T' $T^{xx}$ to their normal positions in their respective cylinders, thereby raising the weights $T^{10}$ $T^{11}$ above the lever $O^{23}$ to the position shown in the drawings, and as the piston $G^3$ is now at its lowest point and the cylinder G filled with water, I open valves M and S, which at once relieves the pressure on the rams F, R, T', and $T^{xx}$, allowing them and the spindles $O^9$ $O^{12}$, by means of the weighted levers $O^{20}$ $O^{23}$, to fall, the water in the press-cylinder E being passed through pipe H and escaping through outlet S' of the valve S; but should the piston $G^3$ only have traveled a portion of the distance between $x'$ and the bottom of the cylinder G, then on opening the valves S and M the water in the smaller cylinder $G^7$ would then, as previously described, escape through outlet L' of valve M—that is to say, the water is returned through the same passages, annular areas, and perforations as the inlet-water was passed to the smaller cylinder $G^7$.

It will be readily understood from the herein-described operations that during the raising of the piston $G^3$ to its highest position three distinct and varying pressures may be imparted to the ram F and again on the descent of the piston three more distinct and varying pressures may be also imparted to the said ram. The pressure at which the inlet-water is admitted may be the same for all of the stages—namely, first, the pressure imparted to the ram F during the upward traverse of the piston $G^3$—say between the bottom of the cylinder G and point $x'$—is considerably below that at which the inlet-water enters the smaller cylinder $G^7$; second, during the upward traverse of the piston—say between points $x'$ and $x$—there is an increase of pressure given to the ram F, but it is less than the initial pressure of the inlet-water; third, a further increase of pressure is imparted to the ram F, but still below the initial pressure of the inlet-water, during the upward traverse of the piston between, say, point $x$ and the top of the cylinder; fourth, on the descent of the piston between, say, the top of cylinder and point $x$ the pressure is increased above that of the inlet-water when the water from the annular area $G^{10}$ and cylinder $G^7$ is simultaneously passed to the ram F; fifth, a further increase of pressure is obtained during the downward traverse of piston between, say, points $x$ and $x'$ when the water in the annular area $G^{10}$ alone is passed to the ram F; sixth, a still greater or full pressure is given to ram F during the downward traverse of the piston between, say, point $x'$ and the bottom of the cylinder when the water is passed from the small cylinder $G^7$ through passage $G^9$ in the fixed tubular ram to the press-cylinder E; but when it is desired to apply my system of valves to that class of differential accumulators or intensifiers in which a fixed tubular ram works in a hollow ram, which in turn works in a cylinder, thereby dispensing with the piston $G^3$ and using only, say, fixed tubular ram $G^8$, small cylinder $G^7$ as a hollow ram, and cylinder G, then a valve with only two spindles may be employed, as shown at Figs. 7, 8 and 9. In this arrangement of valves the pivot-pillar $O^{21}$ is also dispensed with.

For quickly raising the table D to its work, the inlet-water under pressure—say from the pumps—is admitted through valve M, pipe L, passage $O^{\times\times}$, annular area $O^{32}$, perforations $O^{13}$, down hollow portion of spindle $O^9$, out through perforations $O^{14}$, into annular area $O^{33}$, passage $O^5$ to pipe I, (owing to the exit from passage $O^5$ being closed,) and thence through the passage $G^9$ in the fixed tubular ram to the small cylinder $G^7$ for raising it in the cylinder G. The water previously admitted to cylinder G is then forced through pipe J, passages $O^{\times\times\times}$ $O^4$, annular area $O^{34}$, down spindle $O^{10}$, out through perforations $O^{37}$ into annular area $O^{35}$, passage $O^\times$ to pipe H and thence to press-cylinder E, whereby the ram F is quickly raised, but at a reduced pressure. The spindle $O^9$ being weighted at $O^{25}$ on lever $O^{20}$ to keep it down in the compartment O, the lever $O^{20}$ is now raised to a midway position automatically by the pressure being conveyed from pipe H through pipe $R^2$ to cylinder $R'$ for operating ram R for moving spindle $O^{10}$ down to the bottom of its stroke. The inlet-water is now admitted through valve M, passage $O^{\times\times}$, annular area $O^{32}$, perforations $O^{13}$, down spindle $O^9$, out through perforations $O^{14}$ into annular area $O^{33}$, passage $O^5$, (the small cylinder $G^7$ being then at the top of its stroke and pipe I being already filled,) annular area $O^{45}$, through perforations $O^{37}$, up hollow portion of spindle $O^{10}$, out through perforations $O^{36}$ into annular area $O^{35}$, passage $O^\times$ and pipe H to the press-cylinder E at the same pressure at which it enters the compartment O. On the ram R being again lifted by the surplus pressure from the pipe H, the lever $O^{20}$ lifts the spindle $O^9$ to its highest point, the spindle $O^{10}$ remaining down. The inlet-water passes through valve M, pipe L, passage $O^{\times\times}$, annular area $O^{32}$, perforations $O^{14}$, up hollow portion of spindle $O^9$, out through perforations $O^{13}$ into annular area $O^{31}$, passages $O^4$ $O^{\times\times\times}$ and pipe J for conveyance to the cylinder G for depressing the smaller cylinder $G^7$. The water employed for raising the smaller cylinder is now utilized for giving the increased pressure to the press-ram F. During the downward stroke of the smaller cylinder $G^7$ the water therein is forced through passage $G^9$ of the fixed tubular ram into and through pipe I, passages $O^{43}$ $O^5$, annular area $O^{45}$, perforations $O^{37}$, up hollow portion of spindle $O^{10}$, out through perforations $O^{36}$ into annular area $O^{35}$, passage $O^\times$ and pipe H, from which it passes to the press-cylinder E for raising the ram F at an increased pressure.

By opening valves S and M all pressure is relieved and the rams F and R and spindle $O^9$ returned to their lowest position, as shown in the drawings; but should the cylinder $G^7$ not have reached its lowest point when the valves S and M are opened the water from press-cylinder E then passes through pipe H, passage $O^\times$, annular area $O^{35}$, perforations $O^{37}$, up hollow portion of spindle $O^{10}$, through perforations $O^{36}$ into annular area $O^{34}$, passages $O^4$ $O^{\times\times\times}$ and pipe J to cylinder G for returning the small cylinder $G^7$ to its lowest position by the weight of the table D. Any water in the small cylinder $G^7$ then is passed through the passage $G^9$ in fixed tubular ram, pipe I, passages $O^{43}$ $O^5$, annular area $O^{33}$, perforations $O^{14}$, up hollow portion of spindle $O^9$, out through perforations $O^{13}$ into annular area $O^{32}$, passage $O^{\times\times}$ to pipe L and outlet $L'$; but should the smaller cylinder $G^7$ be at the bottom of its stroke when the valves S and M are opened the water from the press-cylinder E will then pass directly therefrom through pipe H and valve S to outlet $S'$.

It will be readily understood from the herein-described operations that three distinct and varying pressures may be imparted to the ram F. First, when the smaller cylinder $G^7$ is raised to its highest point in cylinder G the pressure imparted to the ram F is less than that of the inlet-water as it enters the pipe L; second, the inlet-water is allowed to pass through the valves and admitted to the press-cylinder E at the same pressure as it enters the pipe L, and, third, a full or increased pressure is obtained from cylinder $G^7$ through passage $G^9$ of the fixed tubular ram.

By the use of the herein-described valve the employment of additional check-valves is obviated.

In the drawings I have shown an arrangement of valves at Figs. 1 to 9 which will readily perform all the functions required in carrying this invention into practice; but I desire it to be distinctly understood that I do not limit myself to this precise arrangement, as other suitable arrangements may be employed in place thereof. I would also further have it understood that I am aware that various methods and arrangements of hydraulic apparatus have been proposed for utilizing the water employed for one portion of their operation for afterward imparting a final pressure, and also for returning the piston to its lowest position. I therefore do not claim such broadly except when obtained by the means and in the manner substantially such as herein described.

Having now particularly described the invention and the means whereby it may be carried into practice, what I claim is—

1. The combination of the cylinder G with the smaller cylinder $G^7$, the fixed tubular ram $G^8$ sliding in said smaller cylinder, the piston $G^3$ working in cylinder G, compartments O, O' $O^2$, $O^3$, spindles $O^9$ $O^{10}$ $O^{11}$ $O^{12}$ working in said compartments, press-pipe H, pipe I communicating with fixed tubular ram, pipe J communicating with top of accumulator-cylinder, pipe K communicating with bottom of accumulator-cylinder, inlet-pipe L, pipe N communicating with the tank, and pipe $O^8$ connecting compartments O and $O^3$ together, all substantially as set forth.

2. In a valve for use with hydraulic apparatus the combination of the compartments O O' $O^2$ $O^3$ having annular areas and passages connecting them together, spindles $O^9$ $O^{10}$ $O^{11}$ $O^{12}$ working in said compartments and made partly hollow and perforated as described, weighted levers connected by links to said spindles, hydraulic leathers with metal rings or blocks interposed between them said leathers arranged in sets and back to back for preventing leakage of water from said annular areas, rams R working in cylinders R', pipes $R^2$ connected to the press-pipe H for automatically reversing the said spindles, press-pipe H, pipe I communicating with fixed tubular ram, pipe J communicating with top of accumulator-cylinder, pipe K communicating with bottom of accumulator-cylinder, inlet-pipe L, pipe N communicating with the tank, pipe $O^8$ connecting the compartments O and $O^3$ together, valves M and S connected to pipes L and H, and weights $T^{10}$ $T^{11}$ rams working in cylinders for operating the said weights and pipe $T^2$ connected to pipe H, when a series of different pressures are required to be imparted to the press F during the downward stroke of the piston $G^3$ of the accumulator, as set forth.

In testimony whereof I have hereunto signed my name to this specification in presence of two subscribing witnesses.

WALTER JAMES.

Witnesses:
ADAM C. HART,
ALAN BALCH.